(12) United States Patent
Kuwabara

(10) Patent No.: US 8,744,049 B2
(45) Date of Patent: Jun. 3, 2014

(54) RADIATION GRID, A RADIOGRAPHIC APPARATUS EQUIPPED THEREWITH, AND A METHOD OF MANUFACTURING THE RADIATION GRID

(75) Inventor: Shoji Kuwabara, Ibaraki (JP)

(73) Assignee: Shimadzu Corporation, Kyoto (JP)

( * ) Notice: Subject to any disclaimer, the term of this patent is extended or adjusted under 35 U.S.C. 154(b) by 442 days.

(21) Appl. No.: 12/986,260

(22) Filed: Jan. 7, 2011

(65) Prior Publication Data
US 2011/0170670 A1    Jul. 14, 2011

(30) Foreign Application Priority Data

Jan. 12, 2010   (JP) .................................. 2010-004155

(51) Int. Cl.
*G21K 1/02* (2006.01)
*G21K 1/00* (2006.01)
*H01J 3/28* (2006.01)

(52) U.S. Cl.
USPC ............................ 378/154; 378/147; 250/397

(58) Field of Classification Search
USPC ...................... 378/7, 147–154, 186, 204, 210; 250/370.09, 397; 438/455–459, 118; 430/4, 5, 8, 966, 967; 313/348, 350, 313/352
See application file for complete search history.

(56) References Cited

U.S. PATENT DOCUMENTS

| | | | | |
|---|---|---|---|---|
| 2,143,799 A | * | 1/1939 | Schonander et al. | 378/154 |
| 2,336,026 A | * | 12/1943 | Millenaar | 378/154 |
| 5,357,553 A | * | 10/1994 | Ferlic et al. | 378/154 |
| 5,679,730 A | | 10/1997 | Amano et al. | |
| 6,625,253 B1 | * | 9/2003 | Barnes et al. | 378/155 |
| 7,072,446 B2 | * | 7/2006 | Dobbs et al. | 378/154 |

FOREIGN PATENT DOCUMENTS

| | | |
|---|---|---|
| JP | 9-53000 A | 2/1997 |
| JP | 2002-40196 A | 2/2002 |
| JP | 2008-168110 A | 7/2008 |

OTHER PUBLICATIONS

Master Bond, Adhesive Bonding—Features and Develeopment of High Performance Epoxy Resin Adhesive Bonding Systems by Master Bond, Apr. 25, 2009, http://www.azom.com/article.aspx?ArticleID=4712 (with links to http://www.masterbond.com), pp. 1-5 (article) and 6-11 (linked data sheets).*
Notification of Reasons for Refusal for the Application No. 2010-004155 from Japan Patent Office mailed Feb. 19, 2013.
Notification of Reasons for Refusal for Application No. 2010-004155 from Japan Patent Office mailed Sep. 3, 2013.

* cited by examiner

*Primary Examiner* — Anastasia Midkiff
(74) *Attorney, Agent, or Firm* — Cheng Law Group, PLLC

(57) ABSTRACT

A radiation grid comprises an absorber including absorbing foil strips extending in a direction of extension for absorbing radiation, the absorbing foil strips being arranged in a direction of arrangement perpendicular to the direction of extension; a first covering member for covering one planar surface of the absorber; a second covering member for covering a surface at the opposite side of the one surface of the absorber; first joint members each provided in an area of adjacence between the first covering member and one of the absorbing foil strips forming the absorber, for integrating the two parts; second joint members each provided in an area of adjacence between the second covering member and one of the absorbing foil strips forming the absorber, for integrating the two parts; and connecting members provided to connect ends in the direction of extension of the absorbing foil strips. The connecting members are disposed clear of a middle portion in the direction of extension of each absorbing foil strip.

12 Claims, 13 Drawing Sheets

Fig.13
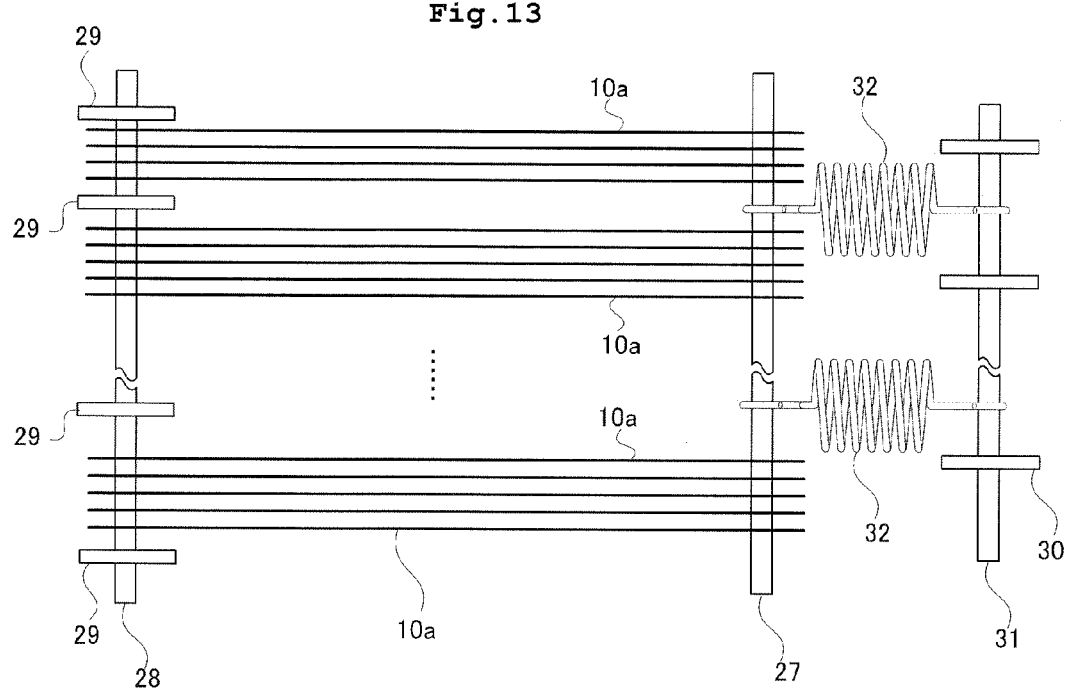
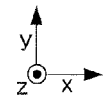
Fig.14
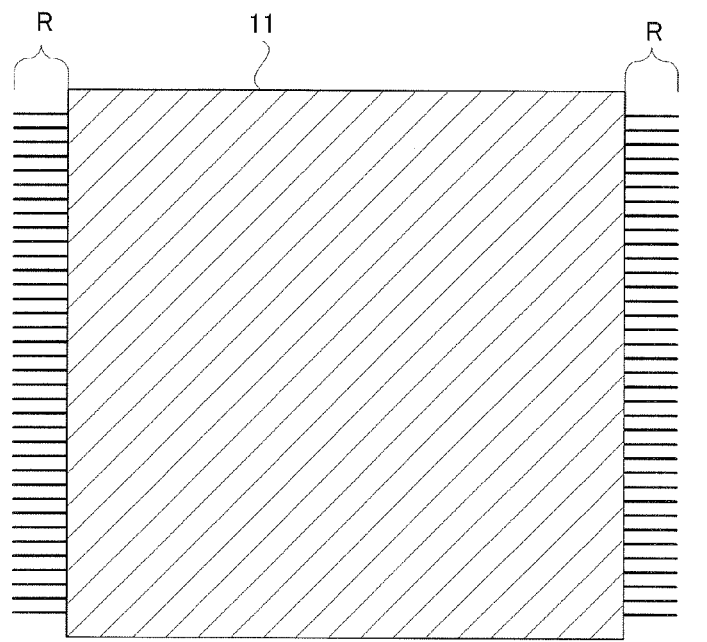
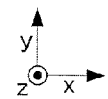

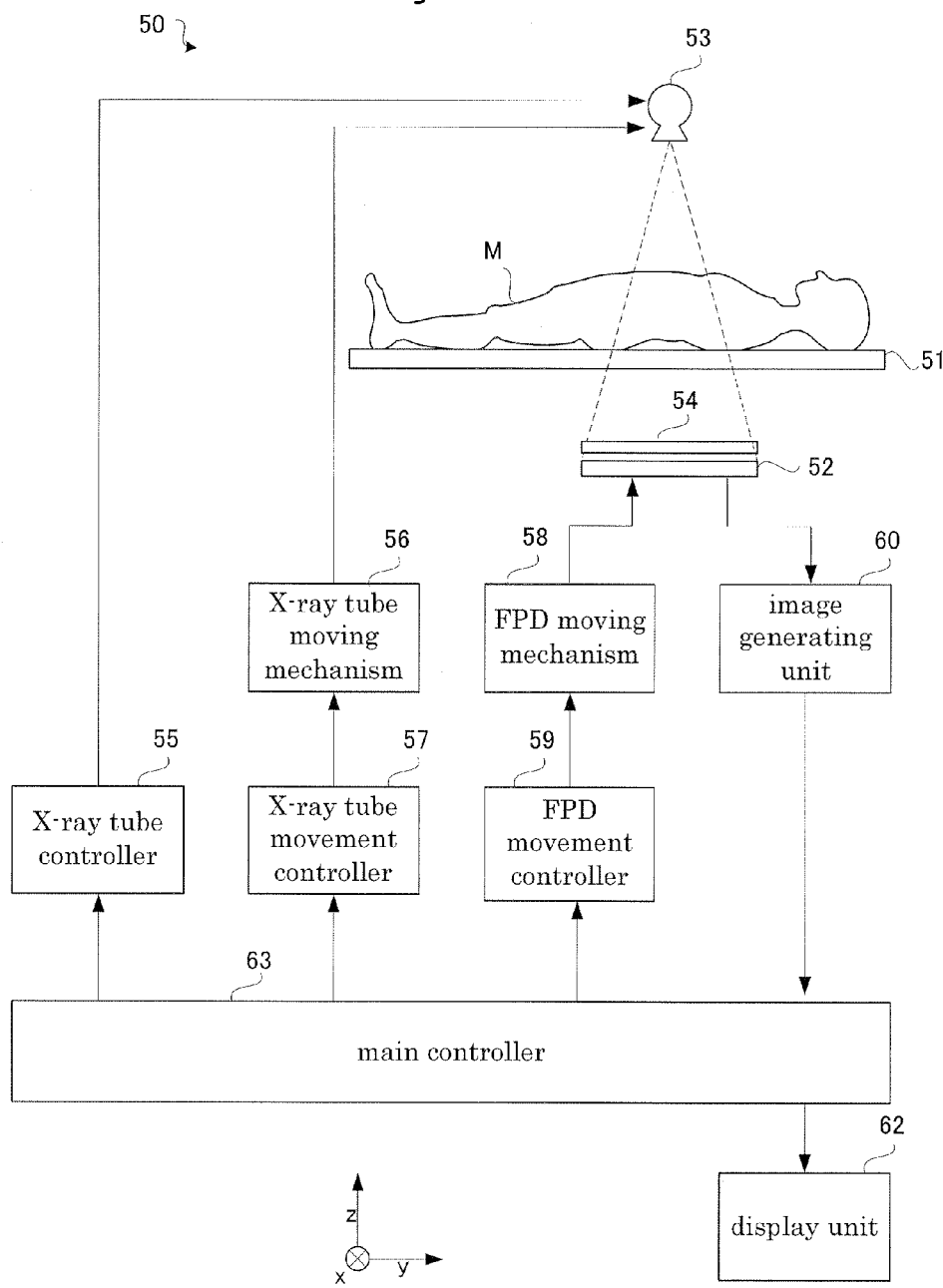

RADIATION GRID, A RADIOGRAPHIC APPARATUS EQUIPPED THEREWITH, AND A METHOD OF MANUFACTURING THE RADIATION GRID

BACKGROUND OF THE INVENTION (1) Field of the Invention

This invention relates to a radiation grid for removing scattered radiation, a radiographic apparatus equipped therewith, and a method of manufacturing the radiation grid. More particularly, the invention relates to a radiation grid which does not need spacers for gaps between adjacent absorbing foil strips, a radiographic apparatus equipped therewith, and a method of manufacturing the radiation grid.

(2) Description of the Related Art

Radiographic apparatus for acquiring fluoroscopic images of patients include a type that emits cone-shaped radiation beams from a radiation source toward a patient, and detects radiation transmitted through the patient with a flat panel detector (hereinafter abbreviated as FPD). Such fluoroscopic images are subject to scattered radiation incident on the FPD after being scattered within the patient during passage through the patient. This becomes a factor for worsening the contrast of the fluoroscopic images. A radiation grid may be provided to cover a radiation detecting plane of the FPD for blocking the scattered radiation incident on the FPD (see Japanese Unexamined Patent Publication No. 2008-168110).

The construction of a conventional radiation grid will be described. As shown in FIG. 1, a conventional radiation grid 71 includes absorbing foil strips 72 formed of lead which easily absorbs radiation, and spacers 73 which support the foil strips 72 to maintain the latter in a linear shape. The absorbing foil strips 72 and spacers 73 are arranged alternately to form a plate-like absorber. Further, grid covers are provided to sandwich the plate-like absorber in between. With the radiation grid 71, direct radiation which proceeds to penetrate the patient mostly passes through the gaps (i.e. spacers 73 to be precise) between adjacent absorbing foil strips 72. Conversely, most of the scattered radiation is incident on the absorbing foil strips 72 to be absorbed there.

In order to obtain a fluoroscopic image with increased sharpness, it is desirable to have a construction which does not include the spacers 73 obstructive to advance of the direct radiation. So, in recent years, a radiation grid without the spacers 73 has been developed. The construction of such a radiation grid will be described. A radiation grid 71 has a pair of grid covers covering an absorber 84. Since the radiation grid 81 has no spacers, each of the absorbing foil strips 82 is fixed by being bonded to the grid covers.

However, the conventional construction has the following problem.

When manufacturing the conventional radiation grid 81, the absorbing foil strips 82 will deform. According to a conventional method of manufacturing the radiation grid 81, it is necessary, after bonding the absorbing foil strips 82 and grid covers 85 and 86, to shape the absorbing foil strips 82 by cutting ends thereof protruding from the grid covers 85 and 86. Each of the absorbing foil strips 82 is supported only by the grid covers 85 and 86, with nothing provided between the absorbing foil strips 82. Therefore, under the stress of a cutting operation, the absorbing foil strips 82 will readily deform. Since the absorbing foil strips 82 become distorted at cut sections, the conventional manufacturing method cannot manufacture the radiation grid 81 with the absorbing foil strips 82 arranged in an orderly manner.

SUMMARY OF THE INVENTION

This invention has been made having regard to the state of the art noted above, and its object is to provide a radiation grid having nothing between absorbing foil strips, in which the absorbing foil strips are arranged in an orderly manner without being deformed, while maintaining radiation transmissivity, a radiographic apparatus equipped with such radiation grid, and a method of manufacturing the radiation grid.

The above object is fulfilled, according to this invention, by a radiation grid comprising an absorber including absorbing foil strips extending in a direction of extension for absorbing radiation, the absorbing foil strips being arranged in a direction of arrangement perpendicular to the direction of extension; a first covering member for covering one planar surface of the absorber; a second covering member for covering a surface at the opposite side of the one surface of the absorber; first joint members each provided in an area of adjacence between the first covering member and one of the absorbing foil strips forming the absorber, for integrating the first covering member and the one of the absorbing foil strips; second joint members each provided in an area of adjacence between the second covering member and one of the absorbing foil strips forming the absorber, for integrating the second covering member and the one of the absorbing foil strips; and connecting members provided to connect ends in the direction of extension of the absorbing foil strips; the connecting members being clear of a middle portion in the direction of extension of each absorbing foil strip.

The construction of this invention includes an absorber having absorbing foil strips extending in a direction of extension and arranged in a direction of arrangement. With a construction providing nothing in the gaps between the absorbing foil strips, the radiation grid can remove only scattered radiation since direct radiation incident on the radiation grid are transmitted without being attenuated. However, with such a construction, the absorbing foil strips are not connected directly, and therefore the mechanical strength of the absorber will become weak. So, according to this invention, connecting members are provided to connect the absorbing foil strips. The absorbing foil strips are thereby integrated to form the absorber, to improve the mechanical strength of radiation grid. Further the connecting members are formed in the end regions in the direction of extension of the absorbing foil strips, and are not provided in the central portion in the same direction. Consequently, fluoroscopic images will be free from disturbances occurring under the influence of the connecting members. Radiological images are usually acquired by locating a site of interest of the patient at the center of a radiation beam. Since the central part of the radiation beam passes through the central portion of the radiation grid, a projection of the site of interest of the patient does not pass through the connecting members provided in the end regions of the radiation grid. Therefore, the connecting members are not obstructive to radiography of the patient.

The end regions of the radiation grid are covered with the connecting members, and these covered portions are strong against mechanical shocks. Even when a certain stress is applied to the end regions of the radiation grid, the end regions of the radiation grid covered with the connecting members will not deform.

In the above radiation grid, it is preferred that the connecting members are provided at opposite ends in the direction of extension of the radiation grid.

The above construction represents a construction of the radiation grid with increased strength. Where the two connecting members are formed in the opposite end regions in the direction of extension of the radiation grid, the opposite end regions of the radiation grid are reinforced to improve the mechanical strength of the radiation grid.

In the above radiation grid, it is preferred that the connecting members are provided to fill entire areas of gaps between the absorbing foil strips adjoining in the direction of arrangement when the radiation grid is seen from the direction of extension.

The above construction represents a more desirable embodiment of the radiation grid. Where entire areas of the gaps between the absorbing foil strips adjoining in the direction of arrangement are filled with the connecting members, not only surfaces of contact between the absorbing foil strips and connecting members are enlarged, but the connecting members have an increased wall thickness. Thus, the radiation grid provided has improved mechanical strength.

In the above radiation grid, it is preferred that the connecting members are formed of a hardened adhesive having thixotropy.

The above construction represents a more desirable embodiment of the connecting members. Where the connecting members are formed of an adhesive having thixotropy, when the adhesive is applied to the absorbing foil strips to form the connecting members, the adhesive having entered the gaps between the absorbing foil strips will not move in the direction of extension along the absorbing foil strips due to capillary action. Then, the adhesive will not enter the central portion in the direction of extension of the radiation grid. The radiation grid provided has the connecting members present in the end regions in the direction of extension with certainty.

A radiographic apparatus equipped with the above radiation grid, preferably, comprises a radiation source for emitting a radiation beam; a radiation detecting device for detecting radiation and generating detection signals; the radiation grid being disposed to cover a radiation incidence plane of the radiation detecting device; and an image generating device for radiating a fluoroscopic image based on the detection signals.

The above construction shows a specific example of radiographic apparatus having the radiation grid according to this invention. A central portion of the radiation detecting device corresponds to the central portion of the radiation grid. End regions of the radiation detecting device correspond to the end regions of the radiation grid. Therefore, a central portion of a fluoroscopic image generated by the image generating device corresponds to the central portion of the radiation grid, and end regions of the fluoroscopic image corresponds to the end regions of the radiation grid. Since the site of interest of the patient is reflected in the central portion of the fluoroscopic image, the site of interest of the patient is projected to a portion of the radiation detecting device different from portions where the connecting members of the radiation grid are projected. Thus, the site of interest of the patient is vividly reflected on the fluoroscopic image without being influenced by the connecting members of the radiation grid.

In the above radiographic apparatus equipped with the radiation grid, it is preferred that the connecting members of the radiation grid are provided outside a radiation detecting area of the radiation detecting device.

According to above construction, the connecting members are prevented from being reflected on images. The radiographic apparatus provided can acquire images excellent in visibility.

A method of manufacturing a radiation grid, according to this invention, comprises (A) an absorbing foil strip arranging step for arranging absorbing foil strips extending in a direction of extension, in a direction of arrangement perpendicular to the direction of extension; (B) a tension applying step for applying tension in the direction of extension to each of the absorbing foil strips; (C) a covering member bonding step for arranging a first covering member and a second covering member to cover opposite planar surfaces of the arrangement of the absorbing foil strips, and bonding, through an adhesive, the first covering member to each of the absorbing foil strips, and the second covering member to each of the absorbing foil strips; (D) a tension canceling step for canceling the tension applied to each of the absorbing foil strips; (E) an end bonding step for forming connecting members connecting ends in the direction of extension of the absorbing foil strips by applying the adhesive to the ends in the direction of extension of the arrangement of the absorbing foil strips, and allowing the adhesive to harden; and (F) a cutting step for cutting and dividing the connecting members together with the absorbing foil strips at the ends in the direction of extension of the absorbing foil strips; thereby manufacturing the radiation grid with the ends in the direction of extension of the absorbing foil strips connected by the connecting members.

Another method of manufacturing a radiation grid, according to this invention, comprises (A) an absorbing foil strip arranging step for creating an absorbing foil strip arrangement by arranging absorbing foil strips extending in a direction of extension, in a direction of arrangement perpendicular to the direction of extension; (B) a tension applying step for applying tension in the direction of extension to each of the absorbing foil strips; (C) a covering member bonding step for arranging a first covering member and a second covering member to cover opposite planar surfaces of the absorbing foil strip arrangement, and bonding, through an adhesive, the first covering member to each of the absorbing foil strips, and the second covering member to each of the absorbing foil strips; (G) a preliminary end bonding step for applying the adhesive to ends in the direction of extension of the absorbing foil strip arrangement from opposite sides which are adjacent one surface of the absorbing foil strip arrangement covered by the first covering member and adjacent the other surface of the absorbing foil strip arrangement covered by the second covering member, and allowing the adhesive to harden; (D) a tension canceling step for canceling the tension applied to each of the absorbing foil strips; (H) a main end bonding step for forming connecting members connecting ends in the direction of extension of the absorbing foil strips by applying the adhesive to the ends in the direction of extension of the absorbing foil strip arrangement, into gaps between portions where the adhesive has hardened after application from adjacent the first covering member and portions where the adhesive has hardened after application from adjacent the second covering member, and allowing the adhesive to harden; and (F) a cutting step for cutting and dividing the connecting members together with the absorbing foil strips at the ends in the direction of extension of the absorbing foil strips; thereby manufacturing the radiation grid with the ends in the direction of extension of the absorbing foil strips connected by the connecting members.

This invention also shows a method of manufacturing the radiation grid which is mechanically strong and has little distortion of the absorbing foil strips. The radiation grid manufactured by this invention includes an absorber having absorbing foil strips for absorbing radiation. The absorbing foil strips extend in a direction of extension, and are arranged in a direction of arrangement perpendicular to the direction of extension. Nothing is provided in a central portion in the direction of extension of each absorbing foil strip. According to the manufacturing method in this invention, while the absorbing foil strips are kept under tension, an adhesive is first applied to end regions in the direction of extension of the arrangement of absorbing foil strips under tension, and the adhesive is allowed to harden. Then, the tension of the absorbing foil strips is canceled, and the adhesive is applied again to strengthen the connection between the absorbing foil strips. The hardened adhesive (connecting members) is cut and divided, whereby the absorbing foil strips embedded in the connecting members are cut at the same time. Since the absorbing foil strips are cut along with the connecting members, the absorbing foil strips are not distorted by the cutting. Moreover, since the adhesive is applied in the state of the absorbing foil strips being under tension, the absorbing foil strips become integrated before the arrangement of absorbing foil strips slightly changes due to cancellation of the tension. Therefore, the manufacturing method according to this invention can manufacture the radiation grid with the absorbing foil strips arranged in a more orderly manner.

In the above method of manufacturing the radiation grid, it is preferred that the connecting members are provided at opposite ends in the direction of extension of the arrangement of the absorbing foil strips.

The above construction represents a construction of the radiation grid with increased strength. Where the two connecting members are formed in the opposite end regions in the direction of extension of the radiation grid, the opposite end regions of the radiation grid are reinforced to improve the mechanical strength of the radiation grid.

In the above method of manufacturing the radiation grid, it is preferred that the connecting members are formed of a hardened adhesive having thixotropy.

The above construction represents a more desirable embodiment of the connecting members to be manufactured. Where the connecting members are formed of an adhesive having thixotropy, when the adhesive is applied in the preliminary end bonding step and main end bonding step, the adhesive having entered the gaps between the absorbing foil strips will not move in the direction of extension along the absorbing foil strips due to capillary action. Then, the adhesive will not enter the central portion in the direction of extension of the radiation grid. The radiation grid provided has the connecting members present in the end regions in the direction of extension with certainty and not obstructive to radiography.

The construction of this invention includes an absorber having absorbing foil strips extending in a direction of extension and arranged in a direction of arrangement, and connecting members for connecting the absorbing foil strips. Thus, the absorbing foil strips are integrated to form the absorber, to improve the mechanical strength of radiation grid. Further the connecting members are formed in the end regions in the direction of extension of the absorbing foil strips, and are not provided in the central portion in the same direction. Consequently, fluoroscopic images will be free from disturbances occurring under the influence of the connecting members.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIG. 13 is a plan view illustrating the method of manufacturing the X-ray grid according to Embodiment 1;

FIG. 14 is a plan view illustrating the method of manufacturing the X-ray grid according to Embodiment 1;

FIG. 22 is a functional block diagram illustrating a construction of an X-ray apparatus according to Embodiment 3, and

DESCRIPTION OF THE PREFERRED EMBODIMENTS

A radiation grid, a radiographic apparatus equipped therewith, and a method of manufacturing the radiation grid will be described next. X-rays in each embodiment correspond to the radiation in this invention.

Embodiment 1

Figure 1:
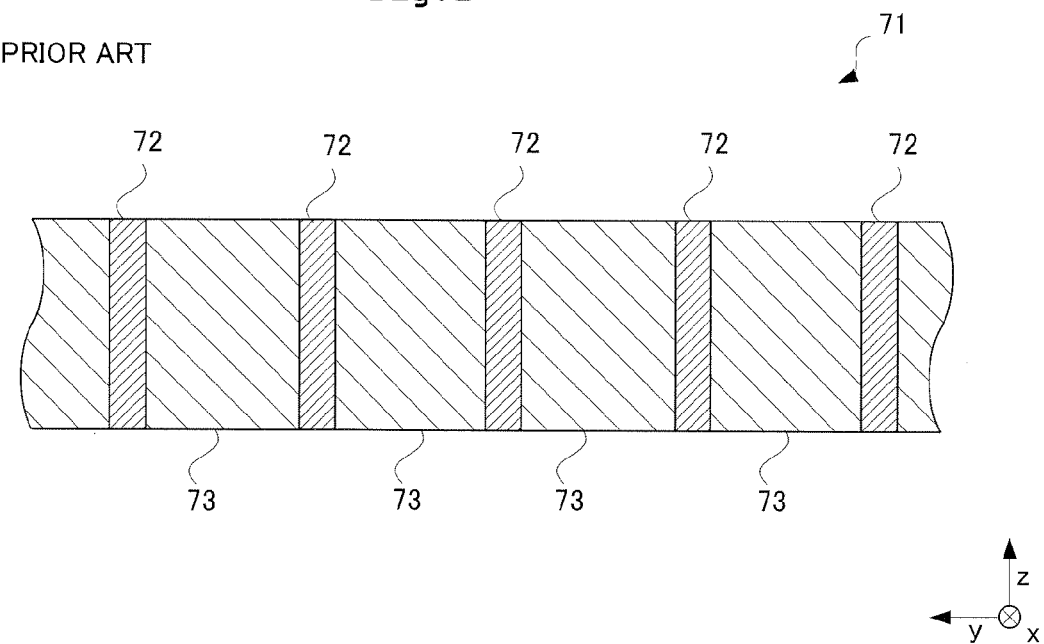
FIG. 1 is a sectional view illustrating a construction of a conventional X-ray grid.
Figure 2:
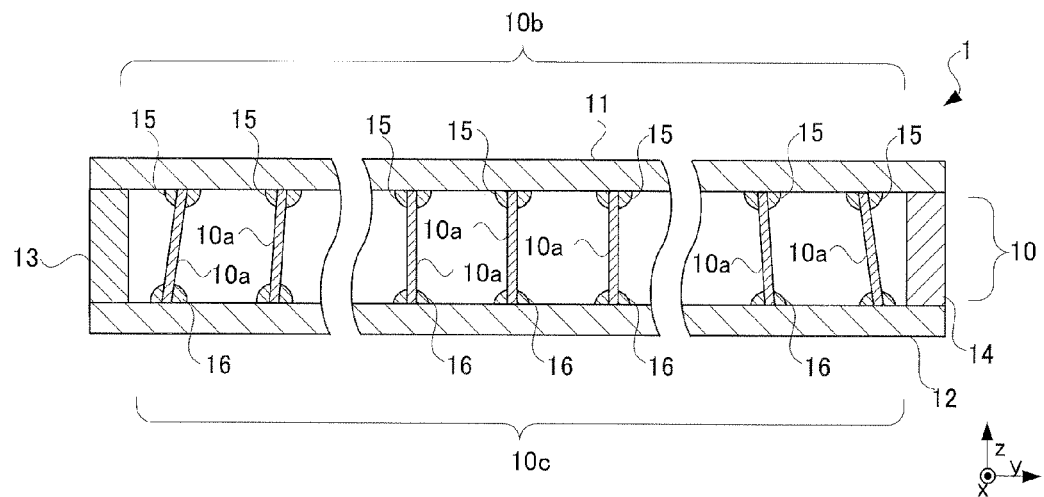
FIG. 2 is a sectional view illustrating a construction of an X-ray grid according to Embodiment 1.

FIG. 2 is a sectional view illustrating a construction of an X-ray grid according to Embodiment 1. As shown in FIG. 2, an X-ray grid 1 according to Embodiment 1 includes an absorber 10 having absorbing foil strips 10a extending in x-direction and arranged in y-direction, a first grid cover 11 covering an upper surface of the absorber 10, a second grid cover 12 covering a lower surface of the absorber 10, and a first side post 13 and a second side post 14 extending in x-direction. The absorber 10 has an incidence plane 10b for receiving X-rays, and an exit plane 10c for letting out the X-rays.

The absorber 10 has absorbing foil strips 10a extending in the x-direction as noted above. The absorbing foil strips 10a are arranged in the y-direction perpendicular to the x-direction, and, when seen as the entire X-ray grid 5, are arranged as in a window blind. The pitch of arrangement is 600 μm, for example. The absorbing foil strips 10a are formed of a material such as tantalum that absorbs X-rays. The x-direction corresponds to the direction of extension in this invention. The y-direction corresponds to the direction of arrangement in this invention. Considering any one of the absorbing foil strips 10a, the x-direction is a direction of extension of the absorbing foil strip 10a, the y-direction is a direction of thickness of the absorbing foil strip 10a, and z-direction is a direction of width of the absorbing foil strip 10a. The x-direction, y-direction and z-direction are all perpendicular to one another. The thickness in the y-direction of the absorbing foil strip 10a is 34 μm.

Inclinations of the absorbing foil strips 10a will be described now. As shown in FIG. 2, the absorbing foil strips 10a of the absorber 10 are gradually inclined as they are closer to the ends in the y-direction of the absorber 10. Thus, the absorbing foil strips 10a provided for the X-ray grid 1 according to Embodiment 1 have varied inclinations to allow passage of X-rays spreading radially when a cone-shaped X-ray beam is emitted.

The X-ray grid 1 has the first grid cover 11 of plate-like shape covering the incidence plane 10b of the absorber 10. Similarly, the second grid cover 12 covers the exit plane 10c of the absorber 10 from the z-direction. Both these grid covers 11 and 12 are formed of glass fiber which easily transmits X-rays, with a thickness of 0.13 mm in the z-direction. The first grid cover 11 covers one planar surface of the absorber 10, while the second grid cover 12 covers the opposite planar surface of the absorber 10. The first grid cover 11 corresponds to the first covering member in this invention. The second grid cover 12 corresponds to the second covering member in this invention.

The first grid cover 11 is bonded to each of the absorbing foil strips 10a constituting the absorber 10. That is, first joint members 15 formed of a hardened adhesive are fixed to areas of contact between the first grid cover 11 and absorbing foil strips 10a. In other words, the first joint members 15 are provided in an area of contact (area of adjacence) between the first grid cover 11 and the incidence plane 10b of the absorber 10. Each of the first joint members 15 is fixed to one end in the y-direction of one absorbing foil strip 10a. The first joint members 15 are fixed in a uniform thickness to the grid cover 11. This avoids a situation where X-rays incident on the first grid cover 11 undergo absorption variations due to uneven thicknesses of the first joint members 15, resulting in disturbances on images. That is, the first grid cover 11 and absorbing foil strips 10a are integrated through the first joint members 15.

Similarly, the second grid cover 12 is bonded to each of the absorbing foil strips 10a constituting the absorber 10. In other words, second joint members 16 are provided in an area of contact (area of adjacence) between the second grid cover 12 and the exit plane 10c of absorber 10. That is, the second joint members 16 formed of a hardened adhesive are fixed to areas of contact between the second grid cover 12 and absorbing foil strips 10a. Each of the second joint members 16 is fixed to the other end, remote from the one end noted above, in the y-direction of one absorbing foil strip 10a. The second joint members 16 are fixed in a uniform thickness to the second grid cover 12, in order to avoid a situation where the incident X-rays undergo absorption variations due to uneven thicknesses of the second joint members 16, resulting in disturbances on images. That is, the second grid cover 12 and absorbing foil strips 10a are integrated through the second joint members 16.

These first joint members 15 and second joint member 16 are formed of a synthetic resin which is a hardened adhesive having thixotropy, and therefore can be applied in a uniform thickness to the surfaces of the two grid covers 11 and 12 joined with the absorbing foil strips 10a. Further, no spilling of the adhesive will occur along the absorbing foil strips 10a after adhesion thereto. Thixotropy is a term expressing physical properties such as of grease having lost fluidity. Specific examples are Bonds E207D, E208 and E209 (manufactured by Konishi Kabushiki Kaisha) conforming to JIS A 6024-1998 (injection epoxy resin for construction repair). The TI value (thixotropic index) of the adhesive used, preferably, is about 5, for example.

The first side post 13 and second side post 14 are members in the shape of square columns extending in the x-direction. The first side post 13 is disposed at one end in the y-direction of the absorber 10, while the second side post 14 is disposed at the other end in the y-direction of the absorber 10. The first side post 13 and second side post 14 are bonded to the two grid covers 11 and 12 by the first joint members 15 and second joint members 16, as are the absorbing foil strips 10a. The first side post 13 and second side post 14 form the opposite ends in the y-direction of the X-ray grid 1, and play the role of fixing the two grid covers 11 and 12 and increasing robustness of the X-ray grid 1.

Figure 3:
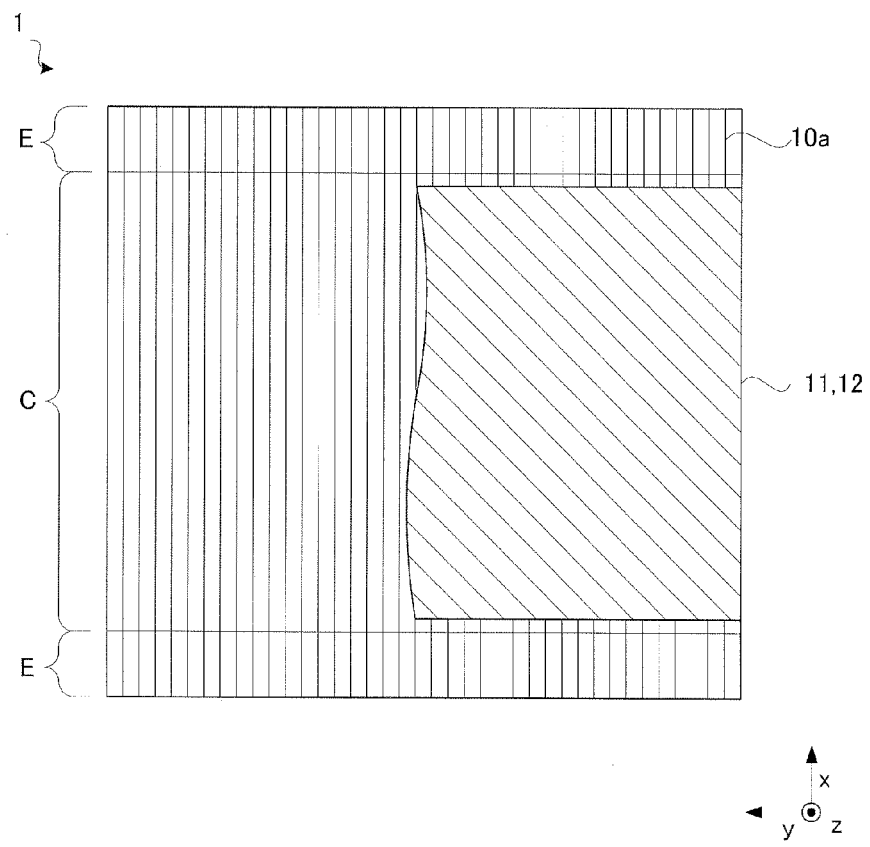
FIG. 3 is a plan view illustrating the construction of the X-ray grid according to Embodiment 1.

FIG. 3 is a plan view illustrating the construction of the X-ray grid according to Embodiment 1. When the X-ray grid 1 is seen from the z-direction, as shown in FIG. 3, the X-ray grid 1 has, at opposite ends in the x-direction thereof, end regions E extending in the y-direction. Similarly, the X-ray grid 1 has, in a middle region in the x-direction thereof, a central portion C of the first joint members 15. The two grid covers 11 and 12 are present in the central portion C.

Figure 4:
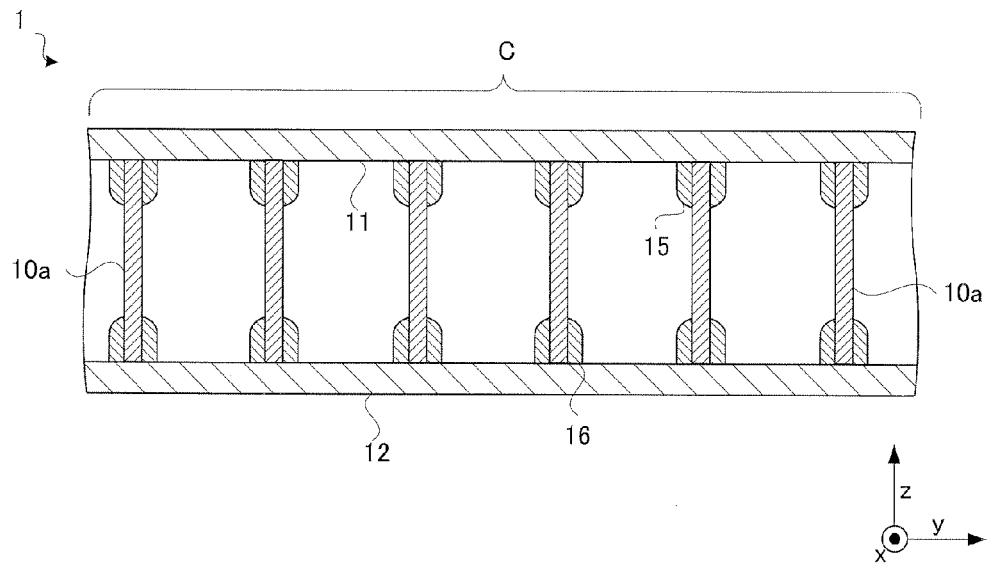
FIG. 4 is a sectional view illustrating the construction of the X-ray grid according to Embodiment 1.

FIG. 4 is a sectional view taken along the y-direction of the central portion C of the X-ray grid 1. Nothing is provided between the absorbing foil strips 10a arranged in the y-direction. Instead, the first joint members 15 are provided in areas of adjacence between the first grid cover 11 and absorbing foil strips 10a. The first joint members 15 are formed of a hardened adhesive applied between the first grid cover 11 and absorbing foil strips 10a, and integrate the first grid cover 11 and absorber 10. Similarly, the second joint members 16 are provided in areas of adjacence between the second grid cover 12 and absorbing foil strips 10a. The second joint members 16 are formed of a hardened adhesive applied between the second grid cover 12 and absorbing foil strips 10a, and integrate the second grid cover 12 and absorber 10. Both joint members 15 and 16 are not in contact with each other.

Figure 5:
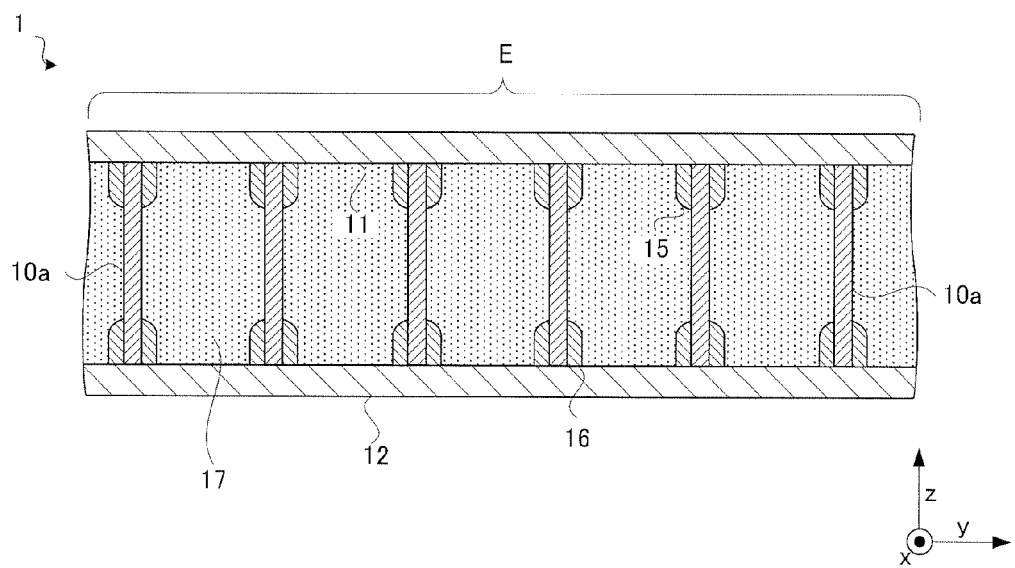
FIG. 5 is a sectional view illustrating the construction of the X-ray grid according to Embodiment 1.

FIG. 5 is a sectional view taken along the y-direction of one of the end regions E of the X-ray grid 1. Between the absorbing foil strips 10a arranged in the y-direction, is a connecting member 17 for connecting the absorbing foil strips 10a adjoining in the y-direction. The connecting member 17 is formed of a hardened adhesive having thixotropy described above, and integrates the absorbing foil strips 10a adjoining in the y-direction. The connecting member 17 is formed to connect end regions in the x-direction of the absorbing foil strips 10a. The connecting member 17 is formed to fill entire areas of gaps between the absorbing foil strips 10a adjoining in the y-direction. Therefore, vacant spaces between the absorbing foil strips 10a in the central portion C present in a region corresponding to an FPD pixel area (see Embodiment 3 for details) are all replaced by the connecting members 17 in the end regions E. The connecting members 17 are not provided in the central portion C in the x-direction of the absorbing foil strips 10a or in the FPD pixel area present inward thereof.

There are two end regions E in the x-direction of the X-ray grid 1, which are opposed to each other across the central portion C. The connecting members 17 are provided in both end regions E. The connecting members 17 are formed of the hardened adhesive having thixotropy.

Figure 6:
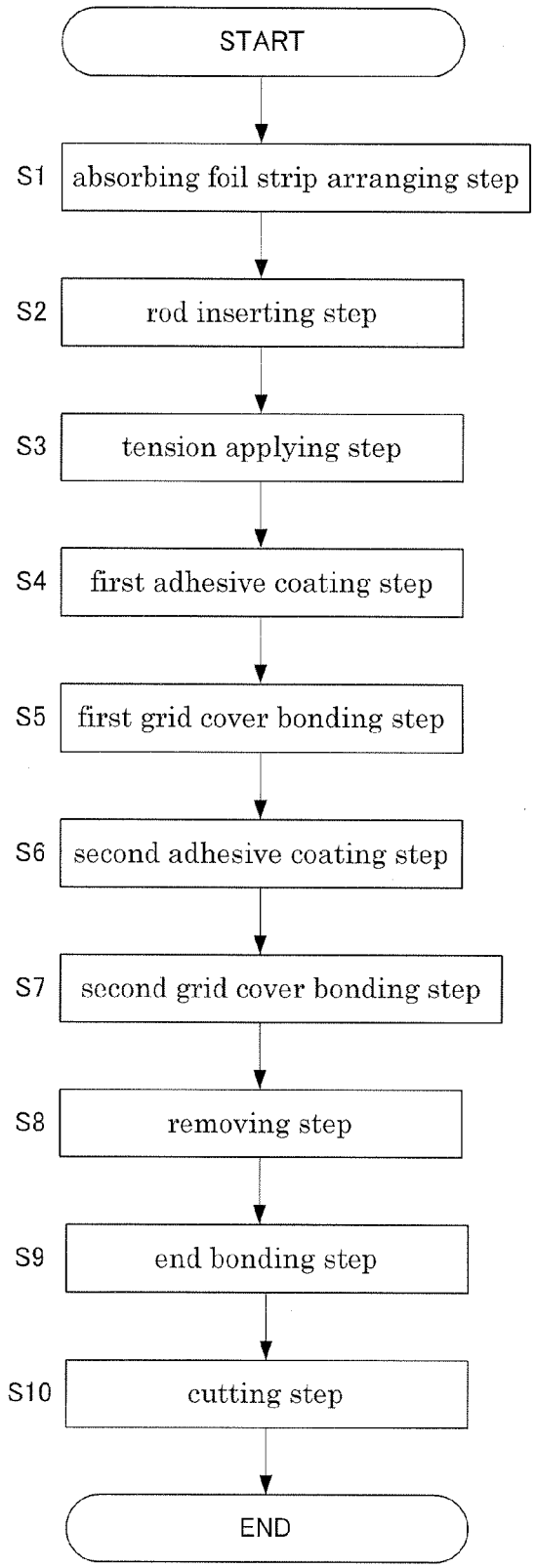
FIG. 6 is a flow chart illustrating a method of manufacturing the X-ray grid according to Embodiment 1.

Next, a method of manufacturing the X-ray grid 1 according to Embodiment 1 will be described. FIG. 6 is a flow chart illustrating the method of manufacturing the X-ray grid according to Embodiment 1. In manufacturing the X-ray grid 1, the absorbing foil strips 10a are first inserted and arranged in comb-shaped plates 23 and 24 provided on an absorbing foil strip arranging table 21 absorbing foil strip arranging step S1). A first rod 27 and a second rod 28 are inserted into through-holes 10d and 10e formed in opposite ends of the absorbing foil strips 10a (rod inserting step S2). Then, tension is applied to the first rod 27 to pull the absorbing foil strips 10a all together (tension applying step S3). First, the first grid cover 11 is coated with an adhesive 39 before hardening in a uniform thickness by squeezing action (first adhesive coating step S4). Next, the first grid cover 11 is bonded to the absorber 10 (first grid cover bonding step S5). After the adhesive applied to the first grid cover 11 hardens, the second grid cover 12 is coated with the adhesive 39 before hardening this time (second adhesive coating step S6). The second grid cover 12 is bonded to the absorber 10 (second grid cover bonding step S7). After the adhesive 39 applied to the two grid covers 11 and 12 hardens, the X-ray grid 1 is removed from the absorbing foil strip arranging table 21 (removing step S8). Then, gaps between the absorbing foil strips 10a at the ends of the X-ray grid 1 are filled and bonded with an adhesive 40 (end bonding step S9). Finally, the opposite ends of the X-ray grid 1 are cut trim (cutting step S10). The above steps will be described in order hereinafter.

<Absorbing Foil Strip Arranging Step S1: Description of the Absorbing Foil Strip Arranging Table>

Figure 7:
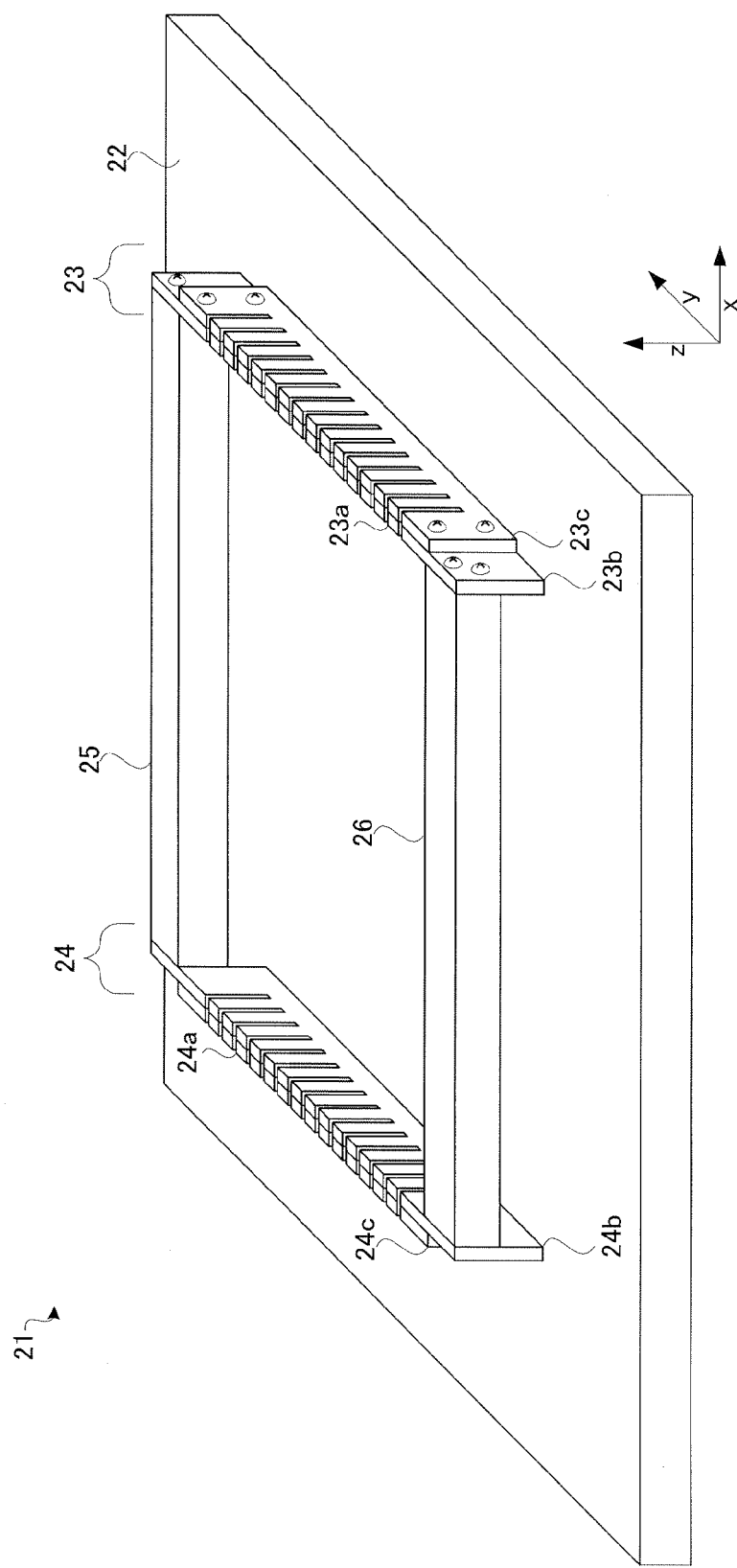
FIG. 7 is a perspective view illustrating the method of manufacturing the X-ray grid according to Embodiment 1.

Before description of the absorbing foil strip arranging step, the absorbing foil strip arranging table 21 according to Embodiment 1 will be described. FIG. 7 is a perspective view illustrating the absorbing foil strip arranging table according to Embodiment 1. As shown in FIG. 7, the absorbing foil strip arranging table 21 according to Embodiment 1 has a pair of comb-shaped plates 23 and 24 fixed to a base 22. The comb-shaped plates 23 and 24 are elongate members extending in the y-direction, and have grooves 23a and 24a extending substantially in the z-direction. These grooves 23a and 24a are formed to penetrate the comb-shaped plates 23 and 24 from the x-direction, and are arranged at equal intervals in the y-direction. The comb-shaped plates 23 and 24 are opposed to each other on the absorbing foil strip arranging table 21. The grooves 23a and 24a receive the absorbing foil strips 10a which are 34 μm thick as described later. These comb-shaped plates 23 and 24 are detachably fixed to the base 22.

Each of the comb-shaped plates 23 and 24 is fixed by screws to struts 25 and 26 extending in the x-direction. That is, the comb-shaped plates 23 and 24 are connected to each other by the struts 25 and 26. The struts 25 and 26 are disposed at ends in the y-direction of the comb-shaped plates 23 and 24. The struts 25 and 26 are square columns having a rectangular section, which are mounted such that one side thereof in the z-direction has a length corresponding to the width of the absorbing foil strips 10a, and a height coinciding with end surfaces of the absorbing foil strips 10a. The four members consisting of the comb-shaped plates 23 and 24 and struts 25 and 26 are arranged in a rectangle to form a frame, and form a space of rectangular parallelepiped centrally thereof. The struts 25 and 26 are not in contact with the base 22, and gaps are provided between the struts 25 and 26 and base 22. The absorbing foil strip arranging table 21 has a rectangular cutout larger than the frame formed by the comb-shaped plates 23 and 24 and struts 25 and 26. The absorbing foil strip arranging table 21 has various members outside the frame, which will be described later.

Figure 8:
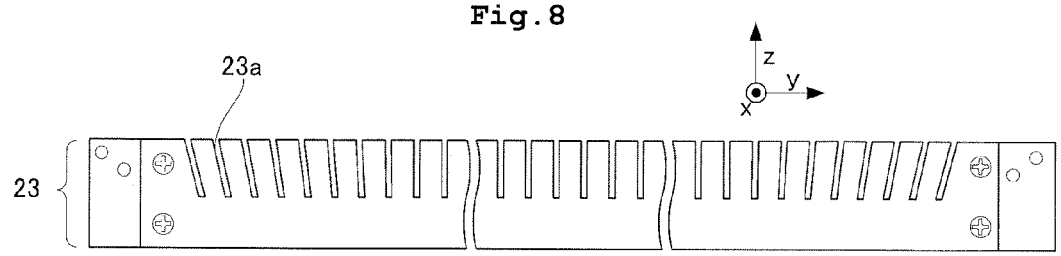
FIG. 8 is a plan view illustrating the method of manufacturing the X-ray grid according to Embodiment 1.

The comb-shaped plates 23 and 24 will be described further. FIG. 8 is a plan view showing the construction of one of the comb-shaped plates according to Embodiment 1. As shown in FIG. 8, the comb-shaped plate 23 has a plurality of grooves 23a extending substantially in the z-direction. These grooves 23a are gradually inclined as they progress from the middle toward ends in the y-direction of the comb-shaped plate 23. Specifically, each of the grooves 23a in end regions of the comb-shaped plate 23 is inclined such that its opening is directed away from the middle of the comb-shaped plate 23. Extensions of these grooves 23a would all converge at one point. This will be called the converging point and its significance will be described later.

Figure 9:
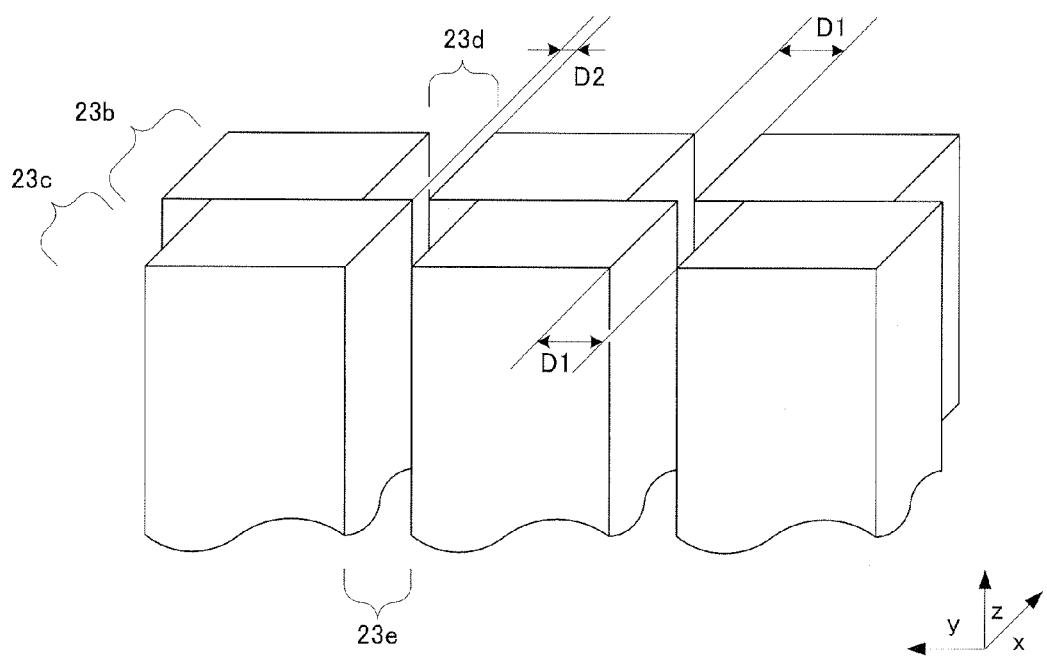
FIG. 9 is a perspective view illustrating the method of manufacturing the X-ray grid according to Embodiment 1.

The comb-shaped plate 23 is formed of two member integrated together. That is, as shown in FIG. 7, the comb-shaped plate 23 includes a main plate 23b extending in the y-direction, and an auxiliary plate 23c also extending in the y-direction but shorter than the main plate 23b, the two plates 23b and 23c being integrated together by screws. Specifically, opposite ends in the y-direction of the auxiliary plate 23c are screwed to the main plate 23b. The main plate 23b and shorter auxiliary plate 23c have grooves extending substantially in the z-direction. These grooves are connected together to define the grooves 23a of the comb-shaped plate 23. FIG. 9 is a perspective view showing the construction of the comb-shaped plate according to Embodiment 1. As shown in FIG. 9, grooves 23d of the main plate 23b and grooves 23e of the auxiliary plate 23c are staggered in the y-direction. Widths D1 in the y-direction of the grooves 23d and 23e are 100 μm. Since the size of widths D1 are about three times the thickness of the absorbing foil strips 10a, the absorbing foil strips 10a inserted in the grooves 23d will clatter in the y-direction. However, the grooves 23d and grooves 23e in Embodiment 1 are shifted 66 μm in the y-direction relative to each other, so that distances D2 between side surfaces located forward in the y-direction of the grooves 23e and side surfaces located rearward in the y-direction of the grooves 23d are 34 μm which corresponds to the thickness of the absorbing foil strips. Therefore, when the absorbing foil strips 10a are passed through the comb-shaped plate 23, the absorbing foil strips 10a will not clatter in the y-direction. The construction of the comb-shaped plate 24 is the same as that of the comb-shaped plate 23. That is, the grooves 24a of the comb-shaped plate 24 are inclined as described above, and the comb-shaped plate 24 has a main plate 24b and an auxiliary plate 24c.

Figure 10:
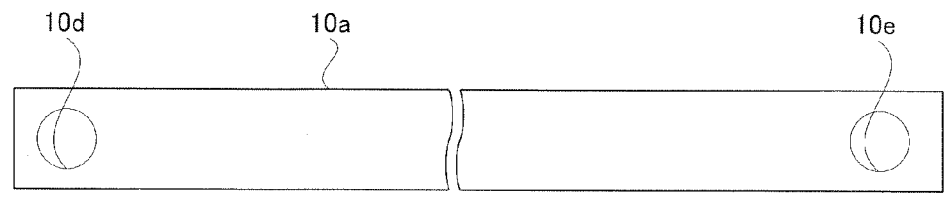
FIG. 10 is a plan view illustrating the method of manufacturing the X-ray grid according to Embodiment 1.

FIG. 10 is a plan view illustrating the construction of an absorbing foil strip according to Embodiment 1. As shown in FIG. 10, the absorbing foil strip 10a extends in the x-direction, and has through-holes 10d and 10e formed in opposite end regions in the x-direction for receiving rods 27 and 28 to be described hereinafter.

<Absorbing Foil Strip Arranging Step S1: Description of Operation>

Figure 11:
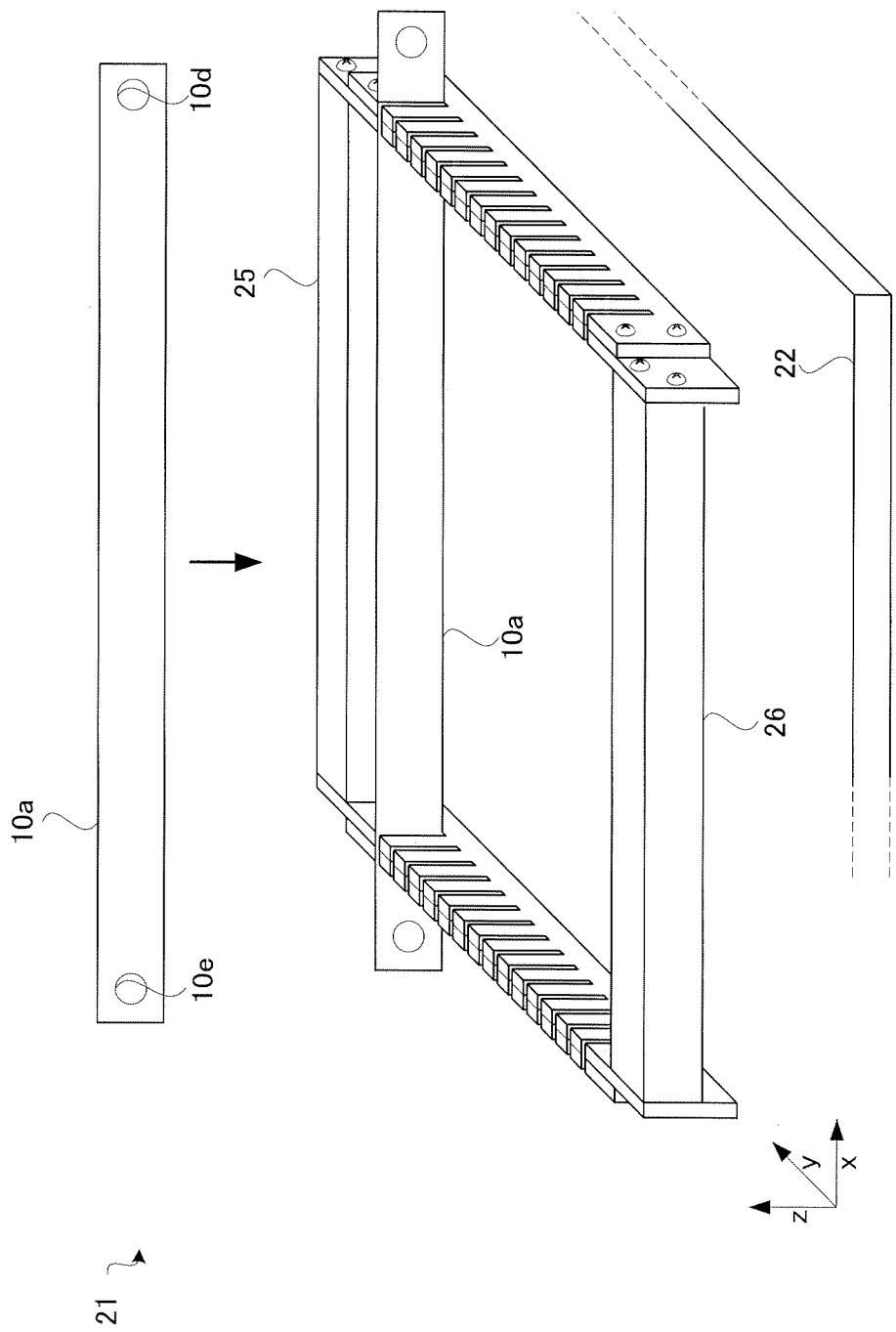
FIG. 11 is a perspective view illustrating the method of manufacturing the X-ray grid according to Embodiment 1.

FIG. 11 is a perspective view illustrating the absorbing foil strip arranging step according to Embodiment 1. As shown in FIG. 11, as an actual operation in the absorbing foil strip arranging step S1, the absorbing foil strips 10a are inserted in the grooves 23a of the comb-shaped plate 23 and the grooves 24a of the comb-shaped plate 24 from the z-direction.

Through this operation, the absorbing foil strips 10a are supported at the opposite ends thereof. The absorbing foil strips 10a do not fit in the above-mentioned frame, but the opposite ends in the x-direction of the absorbing foil strips 10a project outside the frame. Therefore, the through-holes 10d and 10e are present outside the frame. The absorbing foil strip arranging step S1 is completed by inserting the absorbing foil strips 10a in all the grooves 23a and 24a. At this time, about 400 absorbing foil strips 10a have been arranged in the y-direction.

<Rod Inserting Step S2>

Figure 12:
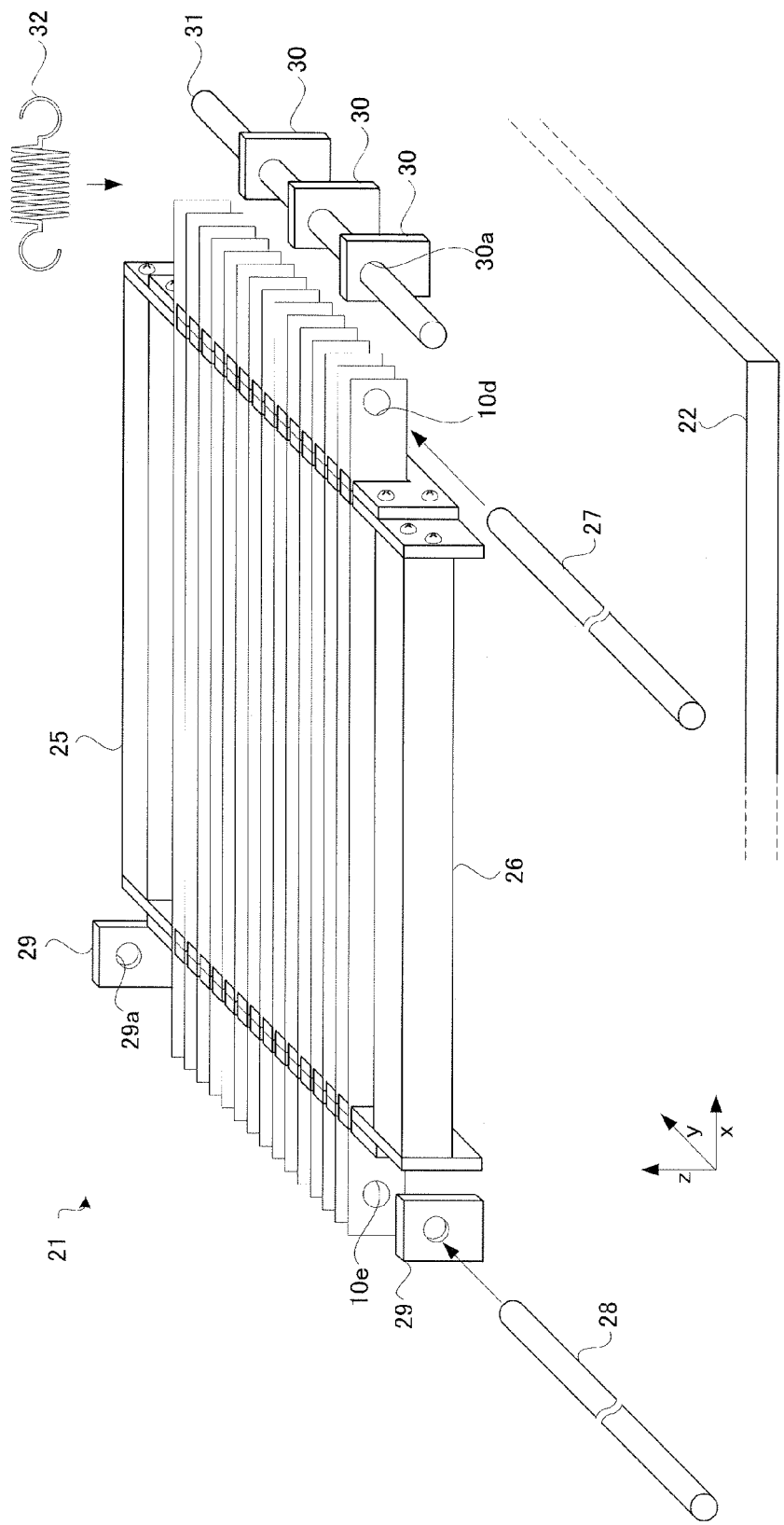
FIG. 12 is a perspective view illustrating the method of manufacturing the X-ray grid according to Embodiment 1.

Next, the first rod 27 and second rod 28 are inserted through the through-holes 10d and through-holes 10e of the absorbing foil strips 10a, respectively. FIG. 12 is a perspective view illustrating the rod inserting step according to Embodiment 1. The approximately 400 absorbing foil strips 10a each have one through-hole 10d whose position in the x-direction is substantially the same. Therefore, after inserting the first rod 27 into the through-hole 10d of the absorbing foil strip 10a located at an end in the y-direction as shown in FIG. 12, the first rod 27 is similarly inserted into the through-holes 10d of the remaining absorbing foil strips 10a. In this way, the first rod 27 is inserted to penetrate all the absorbing foil strips 10a en bloc.

The second rod 28 is inserted through the through-holes 10e of the absorbing foil strips 10a. As is the first rod 27, the second rod 28 is inserted to penetrate all the absorbing foil strips 10a en bloc. The second rod 28 is inserted not only through the absorbing foil strips 10a, but also through a plurality of first anchor elements 29 fixed to the absorbing foil strip arranging table 21. These first anchor elements 29 are disposed outside the frame defined by the comb-shaped plates 23 and 24 and struts 25 and 26, and adjacent the comb-shaped plate 24. The first anchor elements 29 are arranged in the y-direction. The first anchor elements 29 have through-holes 29a extending in the y-direction through the first anchor elements 29. The second rod 28 inserted through the through-holes 29a will remain immovable against a pulling force applied to the absorbing foil strips 10a in the x-direction.

As shown in FIG. 12, a plurality of second anchor elements 30 are fixedly formed on the absorbing foil strip arranging table 21. Specifically, the second anchor elements 30 are disposed outside the frame defined by the comb-shaped plates 23 and 24 and struts 25 and 26, and adjacent the comb-shaped plate 23. These elements will play an important role in the succeeding steps, and will be described. The second anchor elements 30 are arranged in the y-direction. The second anchor elements 30 have through-holes 30a extending in the y-direction through the second anchor elements 30. These through-holes 30a have a third rod 31 inserted therethrough beforehand to extend in the y-direction.

<Tension Applying Step S3>

As seen from FIG. 12, the first rod 27 and third rod 31 are disposed adjacent each other. Therefore, springs 32 can be mounted between the first rod 27 and third rod 31. In the tension applying step S3, the absorbing foil strips 10a are pulled in the x-direction using the springs 32 acting as a tension applying device. In order to apply the tension, each spring 32 has opposite ends thereof forming J-shaped hooks. One of the hooks of each spring 32 is connected to the first rod 27 while the other hook is connected to the third rod 31, so as to bridge the first rod 27 and third rod 31. The springs 32 are arranged at equal intervals in the y-direction in order to apply uniform tension to each of the absorbing foil strips 10a.

In this way, as shown in FIG. 13, the absorbing foil strips 10a are stretched all together between the two rods 27 and 28. In the construction of Embodiment 1, the absorbing foil strips 10a are straightened by applying tension to the absorbing foil strips 10a, whereby the absorbing foil strips 10a can be arranged in a more orderly manner. Thus, the absorbing foil strips 10a are arranged in the y-direction to form the absorber 10.

<First Adhesive Coating Step S4>

Following the tension applying step S3, the first grid cover 11 is coated with the adhesive having thixotropy. Specifically, one surface of the first grid cover 11 is coated with the adhesive 39 in a uniform thickness by squeezing action.

<First Grid Cover Bonding Step S5>

Then, the first grid cover 11 is bonded to one surface of the absorber 10. At this time, the first grid cover 11 is applied to the absorber 10 so that the surface coated with the adhesive 39 of the first grid cover 11 may contact the absorber 10 and struts 13 and 14. Subsequently, the adhesive hardens, and the adhesive 39 applied to the first grid cover 11 becomes the first joint members 15.

<Second Adhesive Coating Step S6>

Next, as in the case of the first grid cover 11, one surface of the second grid cover 12 is coated with the adhesive 39 in a uniform thickness by squeezing action.

<Second Grid Cover Bonding Step S7>

Then, the second grid cover 12 is bonded to the other surfaces of the absorber 10 and struts 13 and 14. At this time, the second grid cover 12 is applied to the absorber 10 so that the surface coated with the adhesive 39 of the second grid cover 12 may contact the absorber 10 and struts 13 and 14. Subsequently, the adhesive 32 is hardened, and the adhesive 39 applied to the second grid cover 12 becomes the second joint members 16.

In this way, the absorbing foil strips 10a and struts 13 and 14 are integrated by both joint members 15 and 16 in the first grid cover bonding step S5 and second grid cover bonding step S7 which correspond to the covering member bonding step in this invention.

<Removing Step S8>

Next, the springs 32 are removed from the absorbing foil strip arranging table 21. Then, the first rod 27 and second rod 28 are drawn out of the absorber 10. Further, the screw connections between the struts 13 and 14 and comb-shaped plates 23 and 24 are undone. And the comb-shaped plates 23 and 24 are released from the base 22. When, at this time, the comb-shaped plates 23 and 24 are pulled along the x-direction away from the absorber 10, the two grid covers 11 and 12, absorbing foil strips 10a and struts 13 and 14 are disconnected in the integrated state from the absorbing foil strip arranging table 21. FIG. 14 shows a state of the X-ray grid after the removing step S8. As shown in FIG. 14, the absorbing foil strips 10a are exposed in opposite end regions R in the x-direction of the X-ray grid, without being covered by the first grid cover 11. These opposite end regions R correspond to portions where the through-holes 10d and 10e are formed in the absorbing foil strips 10a. These portions are unnecessary after completion of the tension applying step S3. It is preferable to remove these opposite end regions R which would be obstructive when the X-ray grid is mounted on the X-ray apparatus. Each subsequent step is executed to remove these opposite end regions R.

<End Bonding Step S9>

Figure 15:
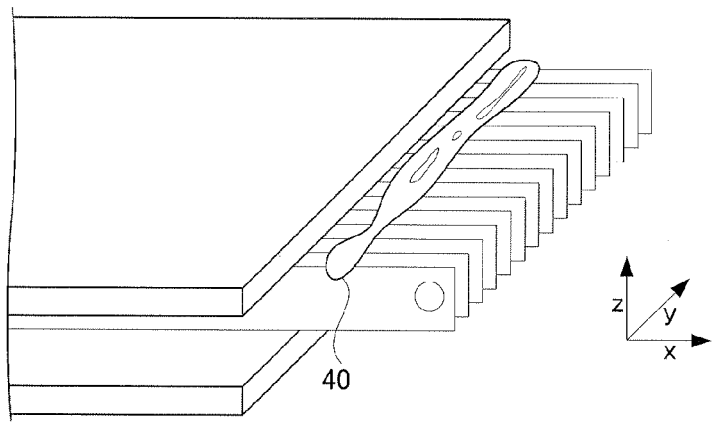
FIG. 15 is a perspective view illustrating the method of manufacturing the X-ray grid according to Embodiment 1.
Figure 16:
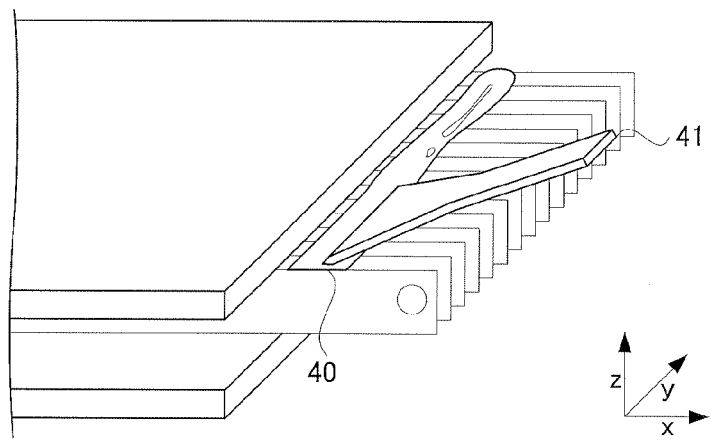
FIG. 16 is a perspective view illustrating the method of manufacturing the X-ray grid according to Embodiment 1.
Figure 17:
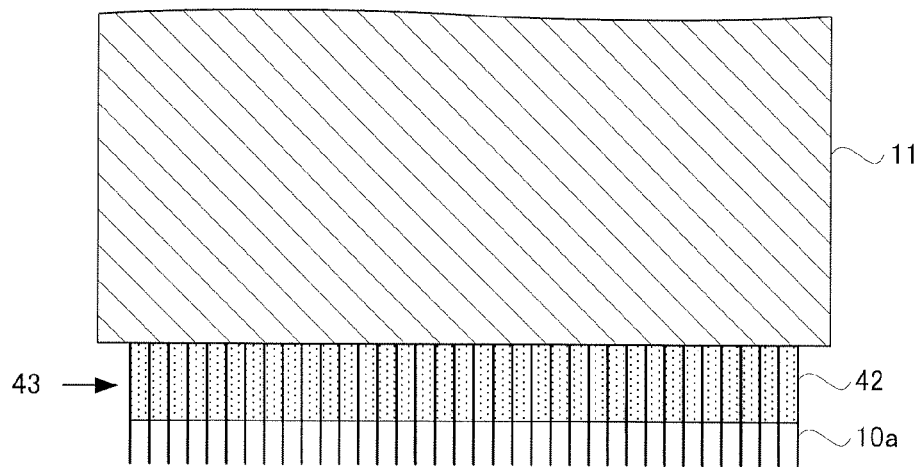
FIG. 17 is a plan view illustrating the method of manufacturing the X-ray grid according to Embodiment 1.

Next, as shown in FIG. 15, thixotropic adhesive 40 before hardening is applied to the opposite end regions R extending in the y-direction. Specifically, the adhesive 40 is applied so as to extend in the y-direction. And, as shown in FIG. 16, the adhesive 40 is pushed in between the absorbing foil strips 10a with a spatula 41. In this way, gaps between adjacent absorbing foil strips 10a are filled with the adhesive 40 before hardening. When the adhesive 40 hardens, as shown in FIG. 17, the absorbing foil strips 10a arranged in the y-direction are connected mechanically by a resin 42. Consequently, the absorbing foil strips 10a are integrated to form the absorber 10. The adhesive 40 having hardened is called the connecting members 17 as appropriate.

<Cutting Step S10>

Figure 18:
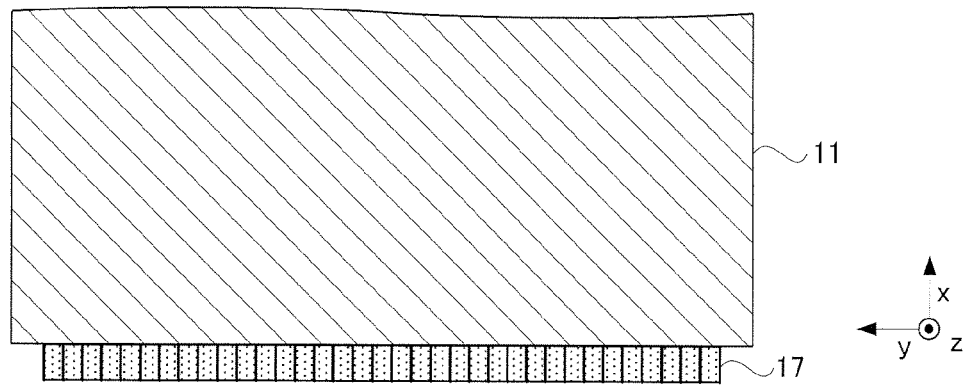
FIG. 18 is a plan view illustrating the method of manufacturing the X-ray grid according to Embodiment 1.

Finally, the opposite ends in the x-direction of the absorber 10 are cut trim. Specifically, as shown in FIG. 17, the end of the X-ray grid is cut along the y-direction, in the position indicated by arrow 43, to halve an area of the hardened resin 42. That is, the ends in the x-direction of the absorbing foil strips 10a are cut to divide the hardened adhesive along with the absorbing foil strips 10a. At this time, the opposite ends of absorbing foil strips 10a are cut trim by moving the blade of a cutter in the y-direction, whereby the opposite end regions of the absorbing foil strips 10a having the through-holes 10d and 10e are excluded from absorber 10. FIG. 18 represents the X-ray grid after the opposite ends thereof are cut off. The cut ends of the X-ray grid 1 resulting from the cutting step are in the state shown in FIG. 5. Thus, the X-ray grid 1 according to Embodiment 1 is completed.

The absorbing foil strips 10a are cut along with the hardened adhesive 40. That is, since the absorbing foil strips 10a are cut as supported by the hardened adhesive 40, the absorbing foil strips 10a are not distorted during the cutting operation. In this way, the X-ray grid 1 with the opposite end regions E in the x-direction of the absorbing foil strips 10a connected by the connecting members 17 is manufactured. In cutting step S10, cooling water is supplied to portions of the X-ray grid being cut, in order to prevent heat generation by the cutter. However, the hardened adhesive 40 blocks passage of the cooling water. Thus, the cooling water will never flow into the gaps between the absorbing foil strips 10a in the central portion.

As described above, the construction in Embodiment 1 includes the absorber 10 having the absorbing foil strips 10a extending in the x-direction and arranged in the y-direction. With a construction providing nothing in the gaps between the absorbing foil strips 10a, the X-ray grid 1 can remove only scattered X-rays since direct X-rays incident on the X-ray grid 1 are transmitted without being attenuated. However, with such a construction, the absorbing foil strips 10a are not connected directly, and therefore the mechanical strength of the absorber 10 will become weak. So, according to Embodiment 1, the connecting members 17 are provided to connect the absorbing foil strips 10a. The absorbing foil strips 10a are thereby integrated to form the absorber 10, to improve the mechanical strength of X-ray grid 1. Further the connecting members 17 are formed in the end regions E in the x-direction of the absorbing foil strips 10a, and are not provided in the central portion C in the same direction, or in an inward portion corresponding to the FPD pixel area (see Embodiment 3). Consequently, X-ray fluoroscopic images will be free from disturbances occurring under the influence of the connecting members 17.

The end regions E of the X-ray grid 1 are covered with the connecting members 17, and these covered portions are strong against mechanical shocks. Even when a certain stress is applied to the end regions E of the X-ray grid 1, the end regions E of the X-ray grid 1 covered with the connecting members 17 will not deform.

Where, as in the construction in Embodiment 1, the two connecting members 17 are formed in the opposite end regions in the x-direction of the X-ray grid 1, the opposite end regions of the X-ray grid 1 are reinforced to improve the mechanical strength of the X-ray grid 1.

Where, as in the construction in Embodiment 1, entire areas of the gaps between the absorbing foil strips 10a adjoining in the y-direction are filled with the connecting members 17, not only surfaces of contact between the absorbing foil strips 10a and connecting members 17 are enlarged, but the connecting members 17 have an increased wall thickness. Thus, the X-ray grid 1 provided has improved mechanical strength.

Where, as in the construction in Embodiment 1, the connecting members 17 are formed of an adhesive having thixotropy, when the adhesive is applied to the absorbing foil strips 10a to form the connecting members 17, the adhesive having entered the gaps between the absorbing foil strips 10a will not move in the x-direction along the absorbing foil strips 10a due to capillary action. Then, the adhesive will not enter the central portion in the x-direction of the X-ray grid 1. The X-ray grid 1 provided has the connecting members 17 present in the end regions E in the x-direction with certainty.

Embodiment 1 also shows a method of manufacturing the X-ray grid 1 which is mechanically strong and has little distortion of the absorbing foil strips 10a. According to the manufacturing method in Embodiment 1, adhesive 40 is first applied to the end regions E in the x-direction of the arrangement of absorbing foil strips 10a, and the adhesive is allowed to harden. Then, the hardened adhesive (connecting members 17) is cut and divided, whereby the absorbing foil strips 10a embedded in the connecting members 17 are cut at the same time. Since the absorbing foil strips 10a are cut along with the connecting members 17, the absorbing foil strips 10a are not distorted by the cutting. Therefore, the manufacturing method in Embodiment 1 can manufacture the X-ray grid 1 with the absorbing foil strips 10a arranged in a more orderly manner.

Embodiment 2

Figure 19:
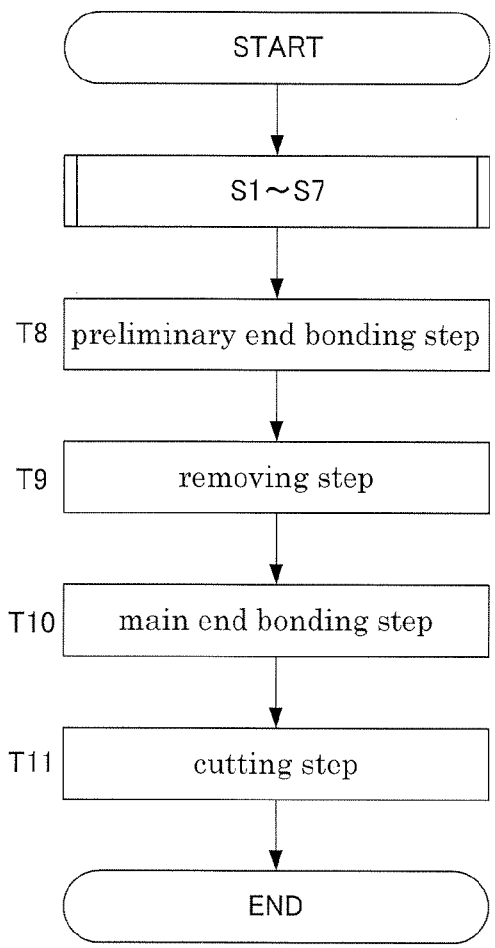
FIG. 19 is a flow chart illustrating a method of manufacturing an X-ray grid according to Embodiment 2.

Next, a method of manufacturing an X-ray grid 1 according to Embodiment 2 will be described. The construction of X-ray grid 1 according to Embodiment 2 is the same as in Embodiment 1, and will not be described again. The manufacturing method according to Embodiment 2 differs from the manufacturing method in Embodiment 1 in that a preliminary end bonding step T8 is executed before the removing step (see FIG. 19). The earlier stage of the manufacturing process in Embodiment 2 is the same as steps S1-S7 in Embodiment 1, and will not be described again. The following description of the manufacturing process according to Embodiment 2 is directed to steps executed after the second grid cover bonding step S7 is completed.

<Preliminary End Bonding Step T8>

Figure 20:
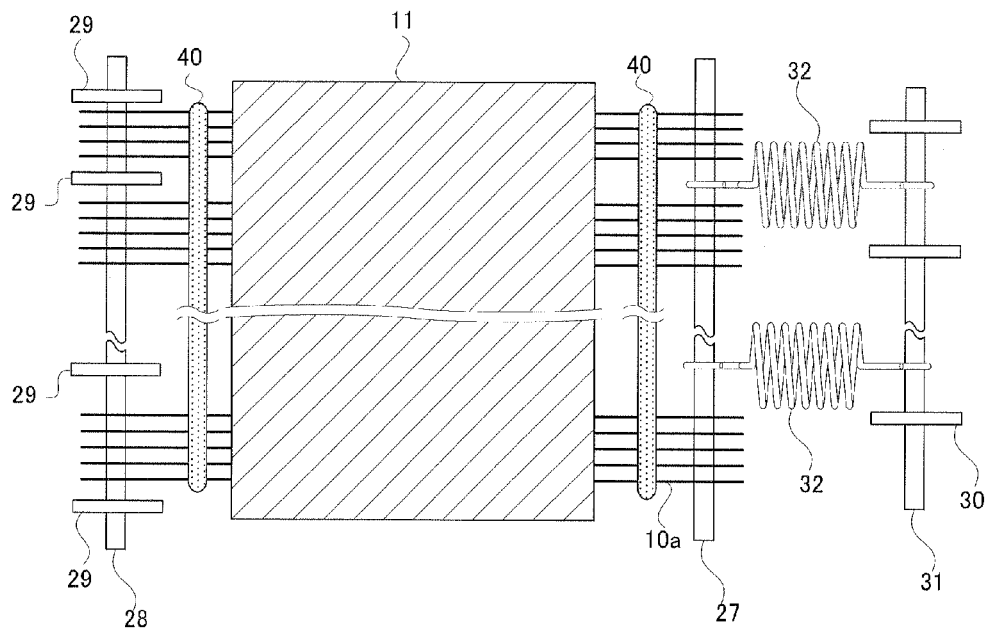
FIG. 20 is a plan view illustrating the method of manufacturing the X-ray grid according to Embodiment 2.

In this step, as shown in FIG. 20, thixotropic adhesive 40 is applied to positions of the absorbing foil strips 10a and struts 13 and 14 between the first grid cover 11 and comb-shaped plate 23, and to positions of the absorbing foil strips 10a and struts 13 and 14 between the first grid cover 11 and comb-shaped plate 24. That is, the adhesive is applied to the opposite end regions in the y-direction of the arrangement of absorbing foil strips 10a from one surface of the arrangement of absorbing foil strips 10a adjacent the first grid cover 11.

Similarly, the adhesive is applied to the opposite end regions in the y-direction of the arrangement of absorbing foil strips 10a from the surface of the arrangement of absorbing foil strips 10a adjacent the second grid cover 12. FIG. 20 is a view of the arrangement of absorbing foil strips 10a seen from the surface adjacent the first grid cover 11. The adhesive 40 is applied to the opposite end regions in the y-direction of the arrangement of absorbing foil strips 10a also from the back surface, invisible in FIG. 20, of the arrangement of absorbing foil strips 10a. Thus, the adhesive 40 is applied to four locations of the arrangement of absorbing foil strips 10a. The adhesive 40 is applied as far as the positions of struts 13 and 14, so as to extend in the y-direction in each location. As the adhesives 40 used, bond E208D having high viscosity is preferred.

<Removing Step T9, Main End Bonding Step T10 and Cutting Step T11>

Figure 21:
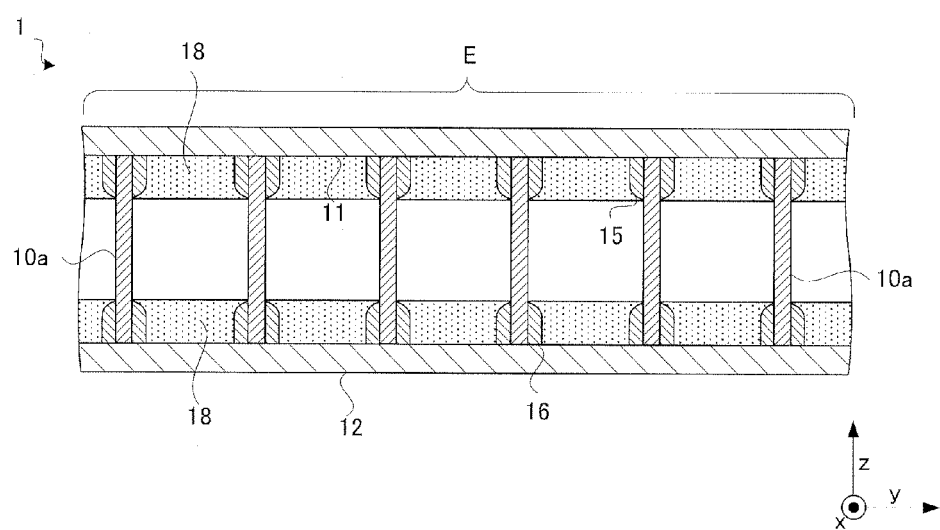
FIG. 21 is a sectional view illustrating the construction of the X-ray grid according to Embodiment 2.

After the adhesive 40 hardens, the X-ray grid 1 is removed from the absorbing foil strip arranging table 21 in the same procedure as the removing step S8 described in Embodiment 1. Then, the adhesive 40 is applied once again, outside the portions of the X-ray grid where the adhesive 40 has been applied. The significance of this step will be described. FIG. 21 is a sectional view taken along the y-direction of an end region E of the X-ray grid before a main end bonding step T10. Sign 18 in FIG. 21 indicates resins resulting from hardening of the adhesive 40 applied in the preliminary end bonding step T8. The resins 18 do not lie deep inside the gaps between the absorbing foil strips 10a. In order to strengthen the connection between the absorbing foil strips 10a further, it is necessary to apply the adhesive 40 again, to the outside in the x-direction of the absorbing foil strips 10a to fill up the gaps between the absorbing foil strips 10a. So, Embodiment 2 provides the main end bonding step T10 after the removing step T9. An actual operation is the same as that of the boding step S9 in Embodiment 1, and will not be described. As the adhesive 40 used in this step, bond E207D having low viscosity is preferred. After the adhesive hardens, the opposite ends in the x-direction of the absorber 10 are cut trim, to complete manufacture of the X-ray grid 1 according to Embodiment 2. In this way, the X-ray grid 1 is manufactured as having the opposite end regions E in the x-direction of the absorbing foil strips 10a connected by the connecting members 17.

As described above, Embodiment 2 shows a method of manufacturing the X-ray grid 1 which is mechanically strong and has little distortion of the absorbing foil strips 10a. According to the manufacturing method in Embodiment 2, while the absorbing foil strips 10a are kept under tension, adhesive 40 is first applied to the end regions E in the x-direction of the arrangement of absorbing foil strips 10a, and the adhesive is allowed to harden. Then, the tension of the absorbing foil strips 10a is canceled, and the adhesive 40 is applied to the outside of the foil strips 10a again to strengthen the connection between the absorbing foil strips 10a. The hardened adhesive (connecting members 17) is cut and divided, whereby the absorbing foil strips 10a embedded in the connecting members 17 are cut at the same time. Since the absorbing foil strips 10a are cut along with the connecting members 17, the absorbing foil strips 10a are not distorted by the cutting. Moreover, since the adhesive 40 is applied in the state of the absorbing foil strips 10a being under tension, the absorbing foil strips 10a become integrated before the arrangement of absorbing foil strips 10a slightly changes due to cancellation of the tension. Therefore, the manufacturing method according to this invention can manufacture the X-ray grid 1 with the absorbing foil strips 10a arranged in a more orderly manner.

Embodiment 3

Next, an X-ray apparatus having the X-ray grid 1 of Embodiment 1 will be described with reference to a drawing. FIG. 22 is a functional block diagram illustrating a construction of an X-ray apparatus according to Embodiment 3. As shown in FIG. 22, an X-ray apparatus 50 according to Embodiment 3 includes a top board 51 for supporting a patient M, an FPD 52 disposed below the top board 51 and having an image sensor, an X-ray tube 53 disposed above the top board 51 for emitting cone-shaped X-ray beams toward the FPD 52, an X-ray grid 54 disposed to cover an X-ray detecting plane of the FPD 52 for removing scattered X-rays, an X-ray tube controller 55 for controlling a tube voltage of the X-ray tube 53, an X-ray tube moving mechanism 56 for moving the X-ray tube 53, an X-ray tube movement controller 57 for controlling the mechanism 56, an FPD moving mechanism 58 for moving the FPD 52, an FPD movement controller 59 for controlling the mechanism 58, an image generating unit 60 for generating fluoroscopic images from signals outputted from the FPD 52, and a display unit 62 for displaying the fluoroscopic images. The X-ray grid 54 is the X-ray grid 1 according to Embodiment 1. The X-ray tube 53 corresponds to the radiation source in this invention. The image generating unit 60 corresponds to the image generating device in this invention. The FPD 52 corresponds to the radiation detecting device in this invention.

A positional relationship between the X-ray grid 1 and FPD 52 will be described. The FPD 52 has a pixel area in an area inside the central portion of the X-ray grid 1. The connecting members 17 of the X-ray grid 1 are disposed outside an X-ray detecting area of the FPD 52. This construction prevents the connecting members 17 from being reflected on images, thereby to acquire images excellent in visibility.

The X-ray apparatus 50 includes also a main controller 63 for performing overall control of the controllers 55, 57 and 59. The main controller 63 has a CPU and, by executing various programs, realizes the controllers 55, 57 and 59 and the image generating unit 60.

For acquiring fluoroscopic images with the X-ray apparatus 50 according to Embodiment 3, a patient M is laid on the top board 51 first. Then, the FPD 52 and X-ray tube 53 are moved to positions opposed to each other across a site of interest of the patient M. Subsequently, the X-ray tube 53 is moved in z-direction to determine a size of a radio-graphic field of view. Then, the X-ray tube 53 is controlled to emit a cone-shaped X-ray beam. The cone-shaped X-ray beam is pulsed. The X-ray beam has a focus coinciding with the converging point of extensions of the grooves 23a of the comb-shaped plate 23. Therefore, the X-ray grid 54 has the absorbing foil strips inclined to follow the directions of movement of X-rays forming the cone-shaped X-ray beam.

X-rays transmitted through the patient M pass through the X-ray grid 54 to fall on the FPD 52. The FPD 52 outputs X-ray detection data to the image generating unit 60. The image generating unit 60 generates a fluoroscopic image based on this data. This fluoroscopic image is displayed on the display unit 62 to complete examination.

As described above, Embodiment 3 shows a specific example of X-ray apparatus having the X-ray grid 1 according to this invention. The pixel area of FPD 54 corresponds to the FPD pixel area of the X-ray grid 1. Therefore, the X-ray fluoroscopic image generated by the image generating unit 60 from the FPD pixel area will be vivid without being influenced by the connecting members 17 of the X-ray grid 1.

This invention is not limited to the foregoing embodiments, but may be modified as follows:

(1) Each of the foregoing embodiments shows a medical apparatus. This invention is applicable also to industrial and nuclear apparatus.

(2) X-rays used in the foregoing embodiments are an example of radiation in this invention. Therefore, this invention can be adapted also for radiation other than X-rays.

(3) The X-ray grid in each of the foregoing embodiments has absorbing foil strips arranged as in a blind. Instead, the absorbing foil strips may be arranged in a lattice pattern to form a cross grid.

This invention may be embodied in other specific forms without departing from the spirit or essential attributes thereof and, accordingly, reference should be made to the appended claims, rather than to the foregoing specification, as indicating the scope of the invention.

What is claimed is:

1. A radiation grid for removing scattered radiation, comprising:
    an absorber including absorbing foil strips extending in a direction of extension for absorbing radiation, the absorbing foil strips being arranged in a direction of arrangement perpendicular to the direction of extension;
    a first covering member for covering one planar surface of the absorber;
    a second covering member for covering a surface at the opposite side of the one surface of the absorber;
    first joint members each provided in an area of adjacence between the first covering member and one of the absorbing foil strips forming the absorber, for integrating the first covering member and the one of the absorbing foil strips;
    second joint members each provided in an area of adjacence between the second covering member and one of the absorbing foil strips forming the absorber, for integrating the second covering member and the one of the absorbing foil strips; and
    connecting members provided to connect ends in the direction of extension of the absorbing foil strips, the connecting members being formed of a hardened adhesive having thixotropy and the connecting members being outside of the covering members;
    the connecting members being clear of a middle portion in the direction of extension of each absorbing foil strip.

2. The radiation grid according to claim 1, wherein the connecting members are provided at opposite ends in the direction of extension of the radiation grid.

3. The radiation grid according to claim 1, wherein the connecting members are provided to fill entire areas of gaps between the absorbing foil strips adjoining in the direction of arrangement when the radiation grid is seen from the direction of extension.

4. The radiation grid according to claim 2, wherein the connecting members are provided to fill entire areas of gaps between the absorbing foil strips adjoining in the direction of arrangement when the radiation grid is seen from the direction of extension.

5. A radiographic apparatus equipped with a radiation grid for removing scattered radiation, comprising:
    an absorber including absorbing foil strips extending in a direction of extension for absorbing radiation, the absorbing foil strips being arranged in a direction of arrangement perpendicular to the direction of extension;
    a first covering member for covering one planar surface of the absorber;
    a second covering member for covering a surface at the opposite side of the one surface of the absorber;
    first joint members each provided in an area of adjacency between the first covering member and one of the absorbing foil strips forming the absorber, for integrating the first covering member and the one of the absorbing foil strips;
    second joint members each provided in an area of adjacence between the second covering member and one of the absorbing foil strips forming the absorber, for integrating the second covering member and the one of the absorbing foil strips;
    connecting members provided to connect ends in the direction of extension of the absorbing foil strips, the connecting members being formed of a hardened adhesive having thixotropy and the connecting members being outside of the covering members:
    a radiation source for emitting a radiation beam;
    a radiation detecting device for detecting radiation and generating detection signals; and
    an image generating device for radiating a fluoroscopic image based on the detection signals;
    wherein the connecting members are clear of a middle portion in the direction of extension of each absorbing foil strip.

6. The radiographic apparatus equipped with the radiation grid according to claim 5, wherein the connecting members of the radiation grid are provided outside a radiation detecting area of the radiation detecting device.

7. The radiographic apparatus equipped with the radiation grid according to claim 5, wherein the connecting members are provided at opposite ends in the direction of extension of the radiation grid.

8. The radiographic apparatus equipped with the radiation grid according to claim 6, wherein the connecting members are provided to fill entire areas of gaps between the absorbing foil strips adjoining in the direction of arrangement when the radiation grid is seen from the direction of extension.

9. A method of manufacturing a radiation grid for removing scattered radiation, comprising:
    (A) an absorbing foil strip arranging step for creating an absorbing foil strip arrangement by arranging absorbing foil strips extending in a direction of extension, in a direction of arrangement perpendicular to the direction of extension:
    (B) a tension applying step for applying tension in the direction of extension to each of the absorbing foil strips;
    (C) a covering member bonding step for arranging a first covering member and a second covering member to cover opposite planar surfaces of the absorbing foil strip arrangement, and bonding, through an adhesive, the first covering member to each of the absorbing foil strips, and the second covering member to each of the absorbing foil strips;
    (G) a preliminary end bonding, step for applying the adhesive to ends in the direction of extension of the absorbing foil strip arrangement from opposite sides which are adjacent one surface of the absorbing foil strip arrangement covered by the first covering member and adjacent the other surface of the absorbing foil strip arrangement covered by the second covering member, and allowing the adhesive to harden;
    (D) a tension canceling step for canceling the tension applied to each of the absorbing foil strips;
    (H) a main end bonding step for forming connecting members connecting ends in the direction of extension of the absorbing foil strips by applying the adhesive to the ends in the direction of extension of the absorbing foil strip arrangement, into gaps between portions where the adhesive has hardened after application from adjacent the first covering member and portions where the adhesive has hardened after application from adjacent the second covering member, and allowing the adhesive to harden; and (F) a cutting step for cutting and dividing the connecting members together with the absorbing foil strips at the ends in the direction of extension of the absorbing foil strips;

thereby manufacturing the radiation grid with the ends in the direction of extension of the absorbing toil strips connected by the connecting members.

10. The method of manufacturing the radiation grid according to claim 9, wherein the connecting members are provided at opposite ends in the direction of extension of the absorbing foil strip arrangement.

11. The method of manufacturing the radiation grid according to claim 9, wherein the connecting members are formed of a hardened adhesive having thixotropy.

12. The method of manufacturing the radiation grid according to claim 10, wherein the connecting members are formed of a hardened adhesive having thixotropy.

* * * * *